US008806940B2

(12) United States Patent
Classen

(10) Patent No.: US 8,806,940 B2
(45) Date of Patent: Aug. 19, 2014

(54) MICROMECHANICAL COMPONENT

(75) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 999 days.

(21) Appl. No.: 12/613,083

(22) Filed: Nov. 5, 2009

(65) Prior Publication Data

US 2010/0122578 A1    May 20, 2010

(30) Foreign Application Priority Data

Nov. 17, 2008   (DE) .......................... 10 2008 043 788

(51) Int. Cl.
*G01P 15/00* (2006.01)

(52) U.S. Cl.
USPC ..................................... 73/514.29; 73/514.32

(58) Field of Classification Search
CPC ....................................................... G01P 15/00
USPC .................. 73/514.32; 257/E21.211; 438/50
See application file for complete search history.

(56) References Cited

U.S. PATENT DOCUMENTS

| | | | | | |
|---|---|---|---|---|---|
| 5,404,749 | A * | 4/1995 | Spangler | .................... | 73/514.29 |
| 5,905,203 | A * | 5/1999 | Flach et al. | ................. | 73/514.32 |
| 6,151,966 | A * | 11/2000 | Sakai et al. | .................. | 73/514.32 |
| 6,230,566 | B1 * | 5/2001 | Lee et al. | ..................... | 73/514.32 |
| 6,428,713 | B1 * | 8/2002 | Christenson et al. | ............. | 216/2 |
| 6,571,628 | B1 * | 6/2003 | Miao et al. | ........................ | 73/488 |
| 6,666,092 | B2 * | 12/2003 | Zarabadi et al. | ............ | 73/514.02 |
| 6,935,175 | B2 * | 8/2005 | Eskridge et al. | ............ | 73/514.32 |
| 6,955,086 | B2 * | 10/2005 | Yoshikawa et al. | ......... | 73/514.32 |
| 7,005,193 | B2 * | 2/2006 | McNeil et al. | ................. | 428/450 |
| 7,059,190 | B2 * | 6/2006 | Sakai et al. | ................. | 73/514.32 |
| 7,140,250 | B2 * | 11/2006 | Leonardson et al. | ....... | 73/504.14 |
| 7,225,675 | B2 * | 6/2007 | Kato et al. | .................. | 73/514.32 |
| 7,574,914 | B2 * | 8/2009 | Mochida | .................... | 73/514.36 |
| 7,578,190 | B2 * | 8/2009 | Lin et al. | ..................... | 73/514.29 |
| 8,020,443 | B2 * | 9/2011 | Lin et al. | ..................... | 73/514.32 |
| 8,074,515 | B2 * | 12/2011 | Van Kann et al. | ........... | 73/382 G |
| 8,322,216 | B2 * | 12/2012 | Yu et al. | ...................... | 73/514.32 |
| 2005/0202585 | A1 * | 9/2005 | Eskridge | .......................... | 438/50 |
| 2007/0000323 | A1 * | 1/2007 | Kuisma | ........................ | 73/514.32 |
| 2008/0264167 | A1 * | 10/2008 | Kandori et al. | ............ | 73/504.12 |
| 2009/0031809 | A1 * | 2/2009 | Lin et al. | ..................... | 73/514.32 |
| 2009/0314085 | A1 * | 12/2009 | Stahl et al. | ................. | 73/514.32 |
| 2010/0122578 | A1 * | 5/2010 | Classen | ...................... | 73/514.32 |
| 2011/0056297 | A1 * | 3/2011 | Classen | ...................... | 73/514.32 |
| 2012/0031185 | A1 * | 2/2012 | Classen et al. | ............. | 73/514.14 |

FOREIGN PATENT DOCUMENTS

| | | |
|---|---|---|
| EP | 0244581 | 11/1987 |
| EP | 0773443 | 5/1997 |

* cited by examiner

*Primary Examiner* — Peter Macchiarolo
*Assistant Examiner* — Samir M Shah
(74) *Attorney, Agent, or Firm* — Kenyon & Kenyon LLP

(57) ABSTRACT

A micromechanical component for detecting an acceleration. The component includes a conductive layer having a first and a second electrode and a rotatable flywheel mass in the form of a rocker having a first and a second lever arm. The first lever arm is situated opposite the first electrode, and the second lever arm is situated opposite the second electrode. The first lever arm has a first hole structure having a number of first cut-outs, and the second lever arm has a second hole structure having a number of second cut-outs. The first and the second lever arm have different masses. The component is characterized by the fact that the outer dimensions of the first and second lever arms correspond, and the first hole structure of the first lever arm differs from the second hole structure of the second lever arm. Furthermore, a method for manufacturing such a micromechanical component is provided.

9 Claims, 7 Drawing Sheets

MICROMECHANICAL COMPONENT

CROSS-REFERENCE

This application claims the benefit under 35 U.S.C. §119 of German Patent Application No. DE 102008043788.3 filed on Nov. 17, 2008, which is expressly incorporated herein by reference in its entirety.

FIELD OF THE INVENTION

The present invention relates to a micromechanical component for detecting an acceleration using a rotatable flywheel mass in the form of a rocker. Furthermore, the present invention relates to a method for manufacturing such a component.

BACKGROUND INFORMATION

Micromechanical components, which are used in the automotive sector as acceleration sensors, for example, normally have a microstructure having a movable functional element. The microstructure, which is also called a MEMS structure (micro-electro-mechanical system), may include a rotatable flywheel mass in the form of a rocker, for example. Examples of such sensors are described in European Patent Nos. EP 0 244 581 A1 and EP 0 773 443 B1. The sensors may be read in a capacitive manner, the lever arms of the rocker acting as electrodes and respectively forming a capacitor with two additional counter-electrodes.

For illustration purposes, FIGS. 1 and 2 show a traditional micromechanical component 100 in a schematic lateral sectional view. Component 100 includes a substrate 110 having three planar electrodes 131, 132, 133. A functional layer 150 in the form of a rotatable rocker is provided above electrodes 131, 132, 133, and it has two lever arms 151, 152 having different lengths. A detailed plan view illustration of component 100 is shown in FIG. 3. FIG. 4 additionally shows the lateral placement of electrodes 131, 132, 133 in relation to lever arms 151, 152. A torsion spring is disposed in an area between lever arms 151, 152, which torsion spring has two torsion bars 158 connected to a supporting element 159. Rocker 150 is connected to substrate 110 or a circuit trace level including electrodes 131, 132, 133 via supporting element 159. Due to the different lengths, lever arm 152 has a surface section acting as a supplementary mass 153 in comparison with lever arm 151, so that a mass asymmetry exists in relation to the torsion spring. Furthermore, a hole structure having traversing cut-outs 155 is provided in rocker 150. By this means, an etching medium may be introduced to a sacrificial layer used in the manufacturing of component 100, whereby the sacrificial layer is removed and rocker 150 is exposed (not shown).

The two electrodes 131, 132 respectively form a capacitor with the above-lying lever arms 151, 152, which is used to detect an acceleration in a capacitive manner. Due to the difference in masses of lever arms 151, 152, the influence of an acceleration force F (perpendicular to substrate 110) causes a rotary motion of rocker 150 around an axis of rotation defined by the torsion spring as shown in FIG. 2, which is associated with a distance modification and thus a capacity modification C−ΔC or C+ΔC between lever arms 151, 152 and electrodes 131, 132. Acceleration F may therefore be detected by measuring the capacity or the capacity modification. In this context, electrode 133, which is disposed under supplementary mass 153 of second lever arm 152, is used to block off the influence of an electric potential of substrate 110 on supplementary mass 153 of rocker 150 during operation of component 100, in order to suppress a deflection caused in this manner. To this end, electrode 133 is connected to the same electric potential as rocker 150.

One aspect that is essential for the measuring accuracy of component 100 is the zero point stability, i.e., whether and to what extent the measuring behavior is subject to an offset. In addition to mechanical stress influences, a zero-point offset may be attributed to electrical effects. This includes potential differences between the circuit trace level including electrodes 131, 132, 133, and rocker 150, which are caused by surface charges, for example. The surface charges may be captured in native oxide layers of components of component 100 of silicon and may cause potential differences in a range of several 0.1 V (approx. 100-500 mV). Forces caused in this manner between electrodes 131, 132, which are used for the evaluation, and lever arms 151, 152 of rocker 150 indeed generally operate symmetrically so that no deflection results from this as long as rocker 150 originally stands straight (i.e., is aligned in a manner parallel to substrate 110). However, a potential difference, caused by surface charges, between screening electrode 133 and rocker 150, indicated by voltage U in FIG. 1, has an effective action of force on supplementary mass 153 or lever arm 152 and thus results in a tilting of rocker 150. Since the process-related surface potentials may change with the temperature or during the lifetime of component 100, for example, the tilting of the rocker may change and thus undesired offset signals may result. Such effects pose a large problem in applications for detecting small acceleration values (low-g sensors) such as ESP (electronic stability program), for example, or starting assistance such as HHC (hill hold control).

Furthermore, supplementary mass 153 results in an increased space requirement and also proves unfavorable for the overload resistance of component 100. The different lengths of lever arms 151, 152 result in different maximum acceleration values, as a function of the direction of the acceleration acting on component 100 in a manner perpendicular to the substrate level, starting from which one of lever arms 151, 152 contacts substrate 110 or the electrodes ("impact acceleration"). In the case of the acceleration direction that moves lever arm 152 in the direction of substrate 110 (FIG. 2), the impact acceleration of component 100 is reduced due to supplementary mass 153.

SUMMARY

An object of the present invention is to provide an improved micromechanical component, in which the above-mentioned disadvantages are avoided. Furthermore, it is an objective of the present invention to specify a method for manufacturing an improved micromechanical component.

According to the present invention, an example micromechanical component for detecting an acceleration is provided, which has a conductive layer having a first and a second electrode and a rotatable flywheel mass in the form of a rocker having a first and a second lever arm. The first lever arm is situated opposite the first electrode, and the second lever arm is situated opposite the second electrode. The first lever arm has a first hole structure having a number of first cut-outs, and the second lever arm has a second hole structure having a number of second cut-outs. Furthermore, the first and the second lever arms have different masses. The outer dimensions of the first and second lever arm correspond, and the first hole structure of the first lever arm differs from the second hole structure of the second lever arm.

In the micromechanical component, an asymmetrical mass distribution of the rocker is realized by designing the hole structures of the lever arm in different manners. Instead of designing the lever arms to have different lengths or having a supplementary mass that takes up an additional surface section on one of the lever arms, the two lever arms have identical outer dimensions. Thus, in the micromechanical component it is possible to omit a screening electrode. This design makes it possible to avoid a deflection of the rocker caused by surface charges, which means that the component has a high zero-point stability. Furthermore, the omission of the supplementary mass and the screening electrode results in a lower lateral space requirement of the component and thus lower manufacturing costs. Furthermore, the component has a higher overload resistance.

In a preferred specific example embodiment, the mass difference between the first and the second lever arm is achieved in that the first cut-outs of the first hole structure and the second cut-outs of the second hold structure have different lateral dimensions.

In an additional preferred specific embodiment, the first electrode has a third hole structure having a number of third cut-outs, and the second electrode has a fourth hole structure having a number of fourth cut-outs, the third hole structure of the first electrode differing from the fourth hole structure of the second electrode. The difference in the hole structures is preferably achieved in that the third cut-outs of the third hole structure and the fourth cut-outs of the fourth hole structure have different lateral dimensions. The provision of hole structures in the electrodes as well is a reliable option for designing the component in a symmetrical manner with regard to electric properties. In this connection, the hole structures of the lever arms and electrodes may be adjusted to each other so that in the event of identical distances between the first electrode and the first lever arm, and the second electrode and the second lever arm, the electric capacities between the first electrode and the first lever arm and between the second electrode and the second lever arm correspond (generally). In this manner, despite the influence of surface charges, it is possible to produce a symmetry with regard to the electric forces on both sides of the rocker. For this reason, no net force, or a negligible net force, is exerted on the rocker, so that the component has a high zero-point stability even in the event of variable surface potentials.

The micromechanical component may be formed on a substrate, an insulating layer being provided between the conductive layer and the substrate. This design results in the existence of parasitic capacitances between the electrodes and the substrate, which may impair the evaluating of the component. The form of the electrodes having a hole structure makes it possible to remove (partially) the insulating layer under the electrodes when manufacturing the component. The cavities formed in this manner have a lower dielectric constant than the insulating layer, through which parasitic capacitances are reduced. Moreover, a weaker mechanical connection of the electrodes to the substrate is achieved. By this means, the electrodes are decoupled at least partially from substrate deformations, which also has a favorable effect on the zero-point stability of the component.

As a function of the size of the cut-outs of the two electrodes, the risk of a complete undercutting may arise. In order to avoid such an undercutting, according to an additional preferred specific embodiment it is provided that the third cut-outs of the third hole structure and the fourth cut-outs of the fourth hole structure respectively are arranged in the form of a grid, the first and second electrodes having regions without cut-outs in the respective grid. A residual component of the insulating layer may remain in these regions and ensure that the conductive layer or the electrodes are connected to the substrate.

In order to obtain the electric symmetry on both sides of the rocker despite these regions, the first lever arm preferably has, in addition to the first cut-outs, a number of further cut-outs, the first cut-outs and the further cut-outs featuring different lateral dimensions. Alternatively, the second lever arm may have a number of further cut-outs in addition to the second cut-outs, the second cut-outs and the further cut-outs featuring different lateral dimensions.

According to the present invention, a method for manufacturing a micromechanical component for detecting an acceleration is also proposed. The method includes providing a substrate, forming an insulating layer on the substrate, forming a patterned conductive layer on the insulating layer having a first and a second electrode, forming a sacrificial layer on the conductive layer, and forming a patterned functional layer on the sacrificial layer for a rotatable flywheel mass in the form of a rocker having a first and a second lever arm. The first lever arm has a first hole structure having a number of first cut-outs, and the second lever arm has a second hole structure having a number of second cut-outs. Furthermore, the first and the second lever arms have different masses. The method also includes removing the sacrificial layer, whereby the flywheel mass is exposed, and the first lever arm is situated opposite the first electrode and the second lever arm is situated opposite the second electrode. The method is characterized by the fact that the patterned functional layer is designed such that the outer dimensions of the first and second lever arm correspond, and that the first hole structure of the first lever arm differs from the second hole structure of the second lever arm. The component manufactured in this manner has the advantages of a high zero-point stability, a negligible space requirement, and a high overload resistance.

BRIEF DESCRIPTION OF THE DRAWINGS

The present invention is explained below in greater detail with reference to the figures.

DETAILED DESCRIPTION OF EXAMPLE EMBODIMENTS

Figure 5:
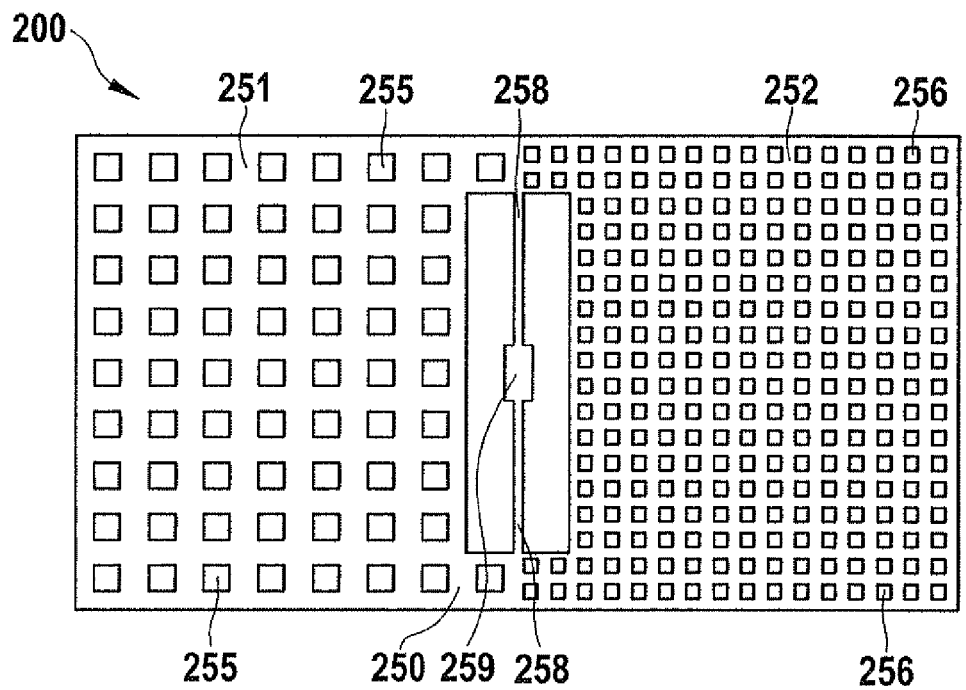
FIG. 5 shows an additional micromechanical component in a plan view.
Figure 9:
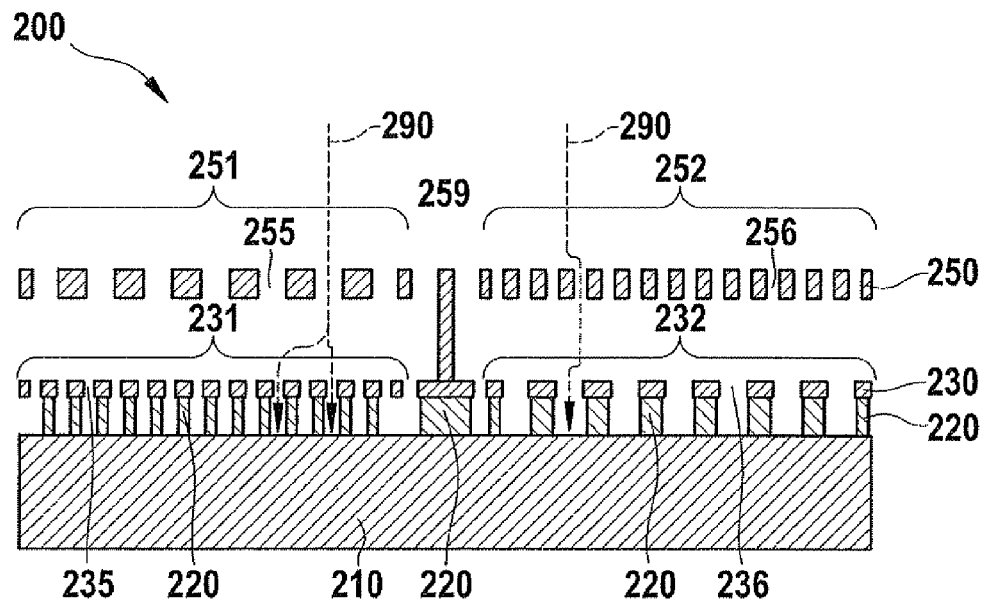

FIG. 5 shows a top-view illustration of a micromechanical component 200 according to one specific embodiment. Component 200 has a rotatable flywheel mass in the form of a rocker 250 having a first lever arm 251 and a second lever arm 252 whose outer dimensions are identical. A recess is provided between the two lever arms 251, 252, and two torsion bars 258 are disposed inside of it. Torsion bars 258 define an axis of rotation, around which rocker 250 may be rotated. Furthermore, torsion bars 258 are connected to a supporting element 259, via which rocker 250 is connected to an underlying conductive layer 230 of a substrate 210 (FIG. 9). Conductive layer 230 includes a first electrode 231 and second electrode 232 whose lateral position relative to lever arms 251, 252 becomes clear with the aid of FIG. 6. In this instance, first lever arm 251 is situated across from first electrode 231, and second lever arm 252 is situated across from second electrode 232, and they respectively form a capacitor with electrodes 231, 232.

Both lever arms 251, 252 have different hole structures having a number of traversing cut-outs 255, 256, which are respectively arranged in the form of a two-dimensional regular grid. For example, cut-outs 255, 256 have a quadratic shape, as shown in FIG. 5. In this instance, the lateral dimensions of cut-outs 255 are larger than those of cut-outs 256. The different degree of perforation has the result that lever arms 251, 252 have different masses and thus an asymmetrical mass distribution exists with regard to torsion bars 258. An acting acceleration (perpendicular to the substrate level or to rocker 250) thus results in a rotary motion of rocker 250 around the axis of rotation defined by torsion bars 258. In this manner, the distances of lever arms 251, 252 to electrodes 231, 232 change and the associated capacitances change in a corresponding manner. In this context, the capacitance change is an index for the acceleration and may be utilized to determine the acceleration.

Figure 6:
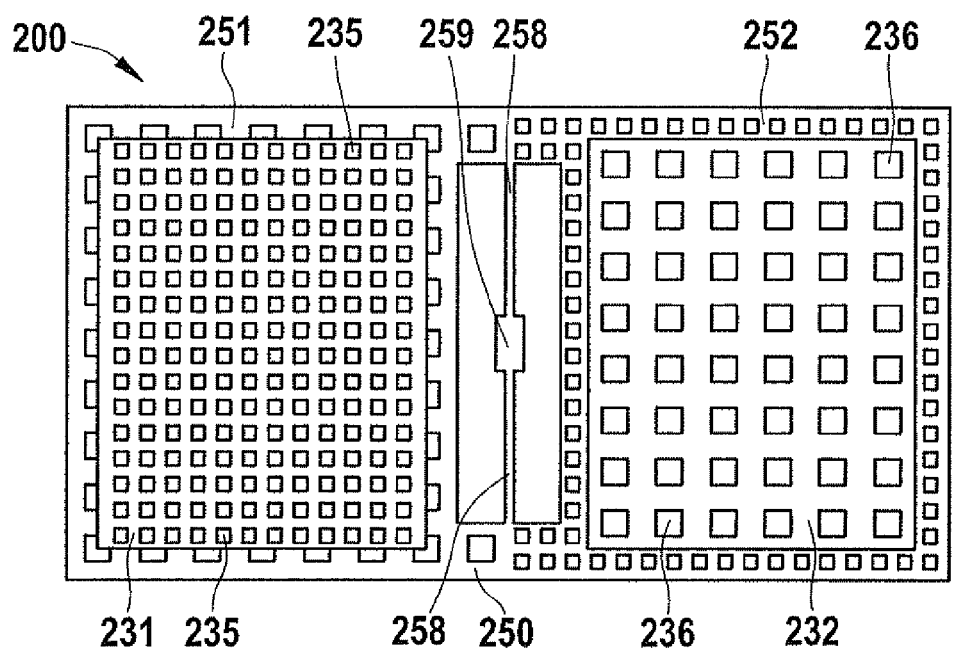
FIG. 6 shows an illustration corresponding to FIG. 5 having an additional illustration of electrodes of the component.

In component 200, lever arms 251, 252 have the same outer dimensions, so that neither of the lever arms 251, 252 includes a supplementary mass, relative to the other, in the form of a supplementary surface section. Thus, component 200 does not have a screening electrode either. By omitting the supplementary mass and the screening electrode, it is possible to avoid a deflection of rocker 250 brought about by surface potentials. To produce electrically symmetrical relations on both sides of rocker 250, the two electrodes 231, 232 are designed with different hole structures, as illustrated in FIG. 6, which respectively have a number of traversing cut-outs 235, 236. Cut-outs 235, 236, which are respectively arranged in the form of a two-dimensional regular grid, have a quadratic shape, for example. In this connection, the lateral dimensions of cut-outs 236 are larger than those of cut-outs 235. The dimensions of cut-outs 235 may correspond to those of cut-outs 256 of lever arm 252 (generally). This also applies to cut-outs 236 and 255.

The electric symmetry results from the fact that lever arm 251 having cut-outs 255 having the larger lateral dimensions (higher degree of perforation) is situated opposite electrode 231 having cut-outs 235 having the smaller lateral dimensions (lower degree of perforation), and accordingly lever arm 252 having cut-outs 256 having smaller dimensions is situated opposite electrode 232 having cut-outs 236 having larger dimensions. This design makes it possible to achieve a situation in which in a starting state of rocker 250, in which no acceleration acts on component 200 and in which identical distances exist between first electrode 231 and first lever arm 251 and between second electrode 232 and second lever arm 252, the electric capacitances between first electrode 231 and first lever arm 252 and between second electrode 232 and second lever arm 252 correspond (generally). In addition to the symmetry with regard to the capacitances, the described arrangement of the hole structures can also produce a symmetry with regard to electric forces due to surface charges. For this reason, rocker 250 is not subjected to any net force, or only a negligible net force, so that component 200 has a high zero-point stability even in the event of variable surface potentials.

In component 200, the influence of surface charges on the zero-point stability may be on the order of magnitude of a remaining electrical residual asymmetry between the two sides of rocker 250. A residual asymmetry may be attributed to different layer thicknesses of rocker 250 and of conductive layer 230 including electrodes 231, 232, and accompanying electric stray fields. In this instance, the electric residual asymmetry may be on an order of magnitude of 1 to 3%, for example, so that the influence of surface charges is less than that of a traditional component, such as, component 100 of FIGS. 1 through 4, by a factor of 30 to 100, for instance. Such an effect may be disregarded in customary applications. To offset a residual asymmetry, the perforations in lever arms 251, 252 and electrodes 231, 232 may be adjusted to each other as part of a fine adjustment, for example. It is also possible to make an offset adjustment to an evaluation device used to evaluate component 200, after a final test of component 200 after its manufacture.

Figure 1:
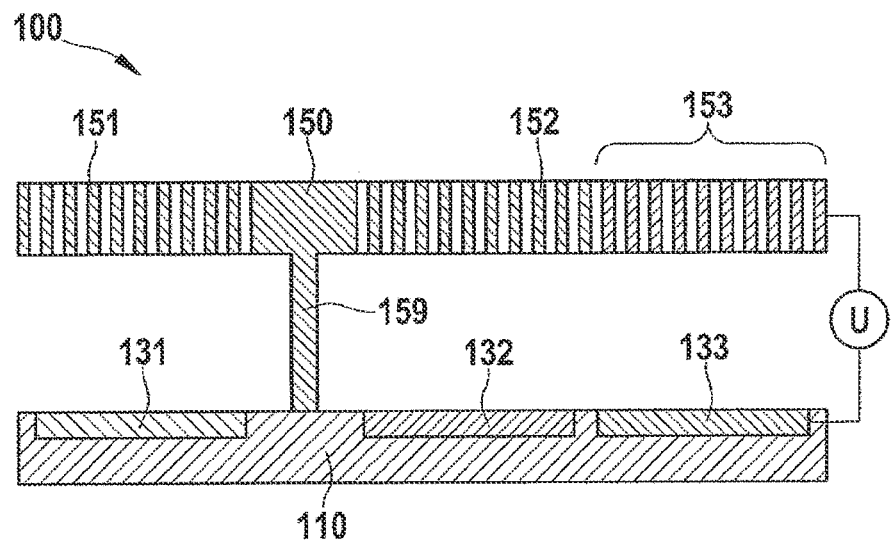
FIGS. 1 and 2 show a traditional micromechanical component in a schematic lateral sectional view.
Figure 2:
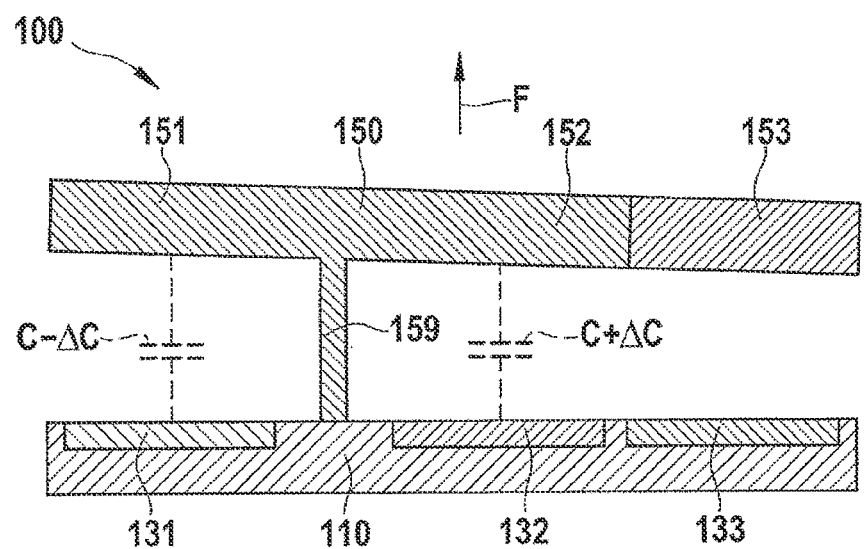
Figure 3:
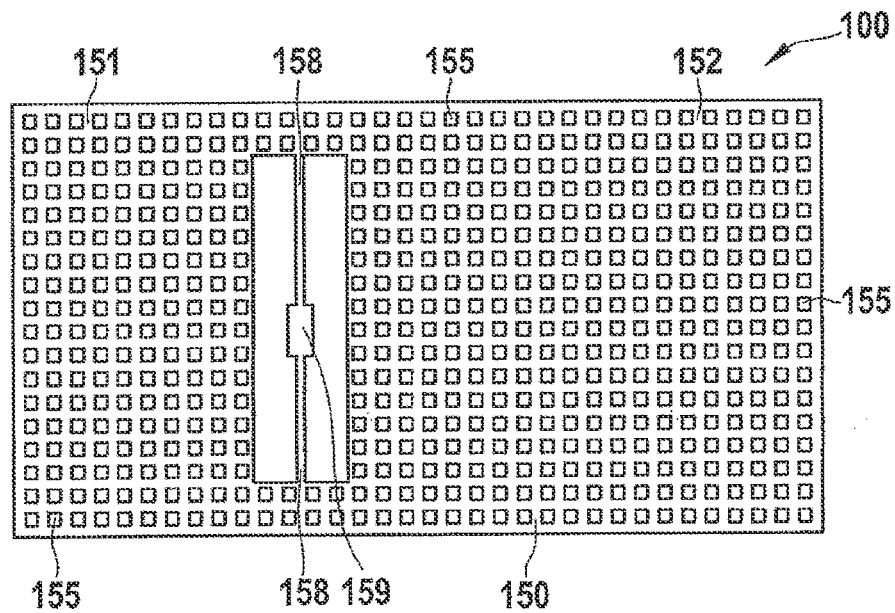
FIG. 3 shows the component of FIGS. 1 and 2 in a plan view illustration.
Figure 4:
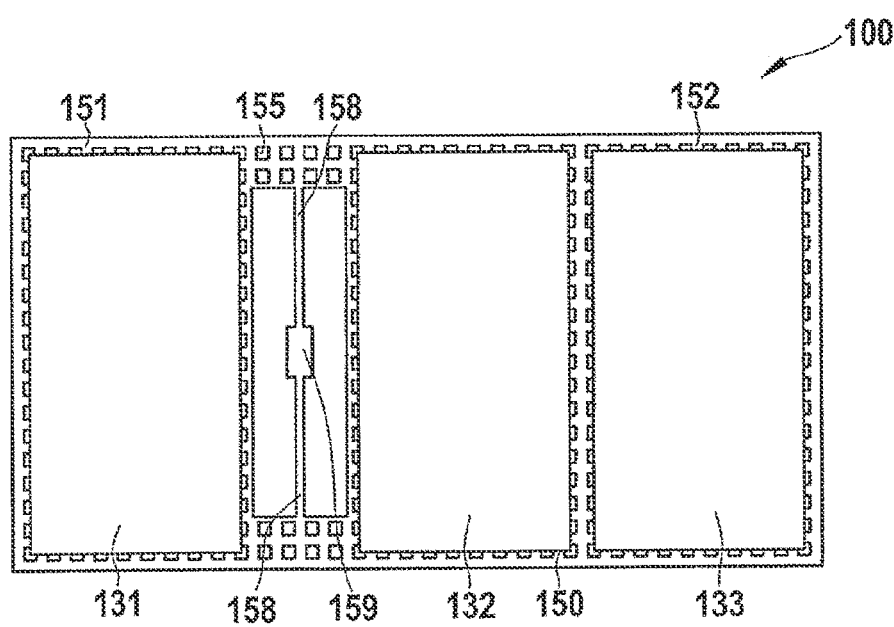
FIG. 4 shows an illustration corresponding to FIG. 3 having an additional illustration of electrodes of the component.

Designing lever arms 251, 252 without a supplementary mass comprising an additional "surface" furthermore has the consequence that rocker 250 may require less lateral space than a rocker of a traditional component, for example, rocker 150 having supplementary mass 153 of component 100 illustrated in FIG. 3. Furthermore, this results in lower costs in the manufacture of component 200. Component 200 also has a higher overload resistance, since a reduction of the impact acceleration associated with supplementary mass 153 does not apply. In order to obtain in component 200 use capacitances that are comparable to those in component 100, the surface savings cannot correspond to the entire surface of supplementary mass 153, however. This has to do with the perforations in lever arms 251, 252 and electrodes 231, 232 and a capacitance reduction associated with them, so that in order to reach identical use capacitances, a part of the "surface savings" must be distributed to lever arms 251, 252 and electrodes 231, 232.

Figure 7:
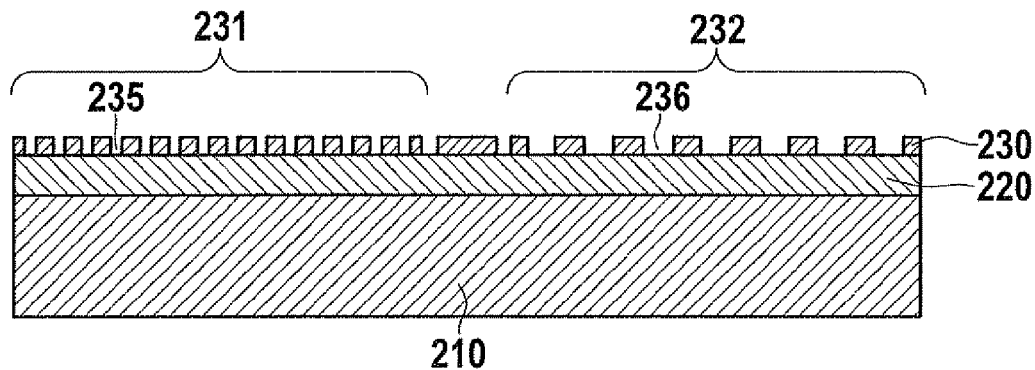
FIGS. 7 to 9 show the manufacturing of the component of FIGS. 5 and 6, respectively in a lateral sectional view.

Additional advantages of component 200 are explained in the following with the aid of a possible manufacturing method, which is illustrated in the lateral sectional views of FIGS. 7 through 9. Processes and materials that are customary in semiconductor technology or surface micromechanics may be used in the manufacturing. At the beginning, a semiconductor substrate 210 is provided, which may be a wafer featuring silicon, for example. An insulating layer 220 is deposited on substrate 210 as illustrated in FIG. 7, and a conductive layer 230 is deposited on insulating layer 220. Insulating layer 220 may be a silicon-oxide layer, for example, which insulates conductive layer 230 from substrate 210. Conductive layer 230 may be a (doped) polysilicon layer, for example.

Conductive layer 230 is furthermore subjected to a patterning, as illustrated in FIG. 7, in order to form circuit trace sections that are separate from one another and to form the two patterned electrodes 231, 232. In this context, the two electrodes 231, 232 have the hole structures having cut-outs 235, 236 illustrated in FIG. 6.

Figure 8:
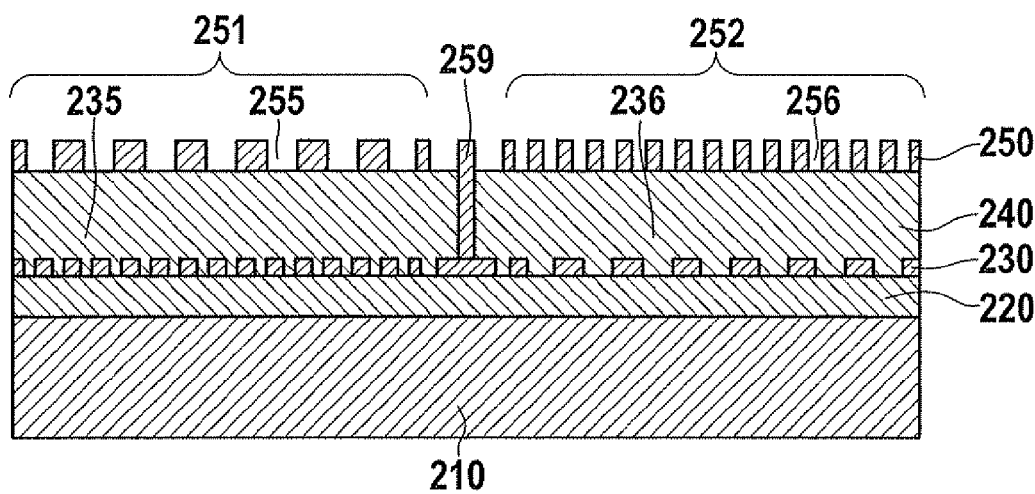

After this, a sacrificial layer 240 is deposited on conductive layer 230 and insulating layer 220, and a functional layer 250 is deposited on sacrificial layer 240, as illustrated in FIG. 8. Sacrificial layer 240 may be a silicon oxide layer, for example. Functional layer 250 is a so-called epi-polysilicon layer, for example, i.e., a polycrystalline silicon layer produced in an epitaxy method, which may optionally be formed in a doped manner. Before functional layer 250 is deposited, a hole is formed in a region of sacrificial layer 240, which exposes conductive layer 230 in a section between electrodes 231, 232, and which is filled by functional layer 250 in order to form a supporting element 259 connected to conductive layer 230. Furthermore, functional layer 250 is patterned in order to provide the seismic mass in the form of the rocker having lever arms 251, 252 and torsion bars 258. In this context, the two lever arms 251, 252 are provided with the hole structures having cut-outs 255, 256 illustrated in FIG. 5.

Subsequently, rocker 250 is exposed as illustrated in FIG. 9. To this end, an etching medium 290 or etching gas, for example, hydrofluoric acid vapor, is introduced to sacrificial layer 240 through the hole structure of functional layer 250 (in FIG. 9, indicated by dashed arrows), through which sacrificial layer 240 is removed. In this connection, etching medium 290 may reach the insulating layer 220 disposed beneath it via cut-outs 235, 236 of electrodes 231, 232, and locally remove it in part, so that layer 220 likewise features a perforation having a number of cut-outs or cavities after the etching process. Due to the perforation of insulating layer 220, a dielectric present in the medium between electrodes 231, 232 and substrate 210 has a lower dielectric constant. In this instance, insulating layer 220, which has a dielectric constant of approximately 4 when silicon oxide is used, is replaced in places by the cavities having a dielectric constant of 1, for example. The reduction of the dielectric constant results in a reduction of parasitic capacitances between electrodes 231, 232 and substrate 210, which aids an exact evaluation of component 200.

An additional effect of the perforation of insulating layer 220 is a weaker mechanical connection of conductive layer 230 and of electrodes 231, 232 to substrate 210. In this manner, component 200 is at least partially decoupled from substrate deformations, which also has a favorable effect on the zero-point stability. Due to the mechanical decoupling, component 200 is in particular less sensitive to mechanical stresses and stress inputs that may occur in stress-encumbered packages such as mold packages, for example.

Additional steps for completing micromechanical component 200 illustrated in FIG. 9 may follow the described method steps. This includes, for example, thinning the back of substrate 210, a separation process, and encapsulating component 200 in order to set a vacuum or a predefined pressure atmosphere in the region of rocker 250, for example. Furthermore, a reinforcement device or an evaluation device may be provided, which may contact electrodes 231, 232 and rocker 250 to apply corresponding electric potentials in order to perform the above-described capacitive detection of an acceleration (not shown). The evaluation device may be implemented on an additional substrate in the form of an application-specific integrated circuit (ASIC, application-specific integrated circuit), and may be connected to substrate 210.

As a function of the dimensions of cut-outs 235, 236 in electrodes 231, 232 and the etching medium used, the following problem may arise: insulating layer 220 under electrodes 231, 232 may be largely or completely removed in the above-described etching step and as a result of this, the mechanical stability of conductive layer 230 may be impaired. Such an underetching of conductive layer 230 may be avoided in the specific embodiments illustrated by the following figures.

Figure 10:
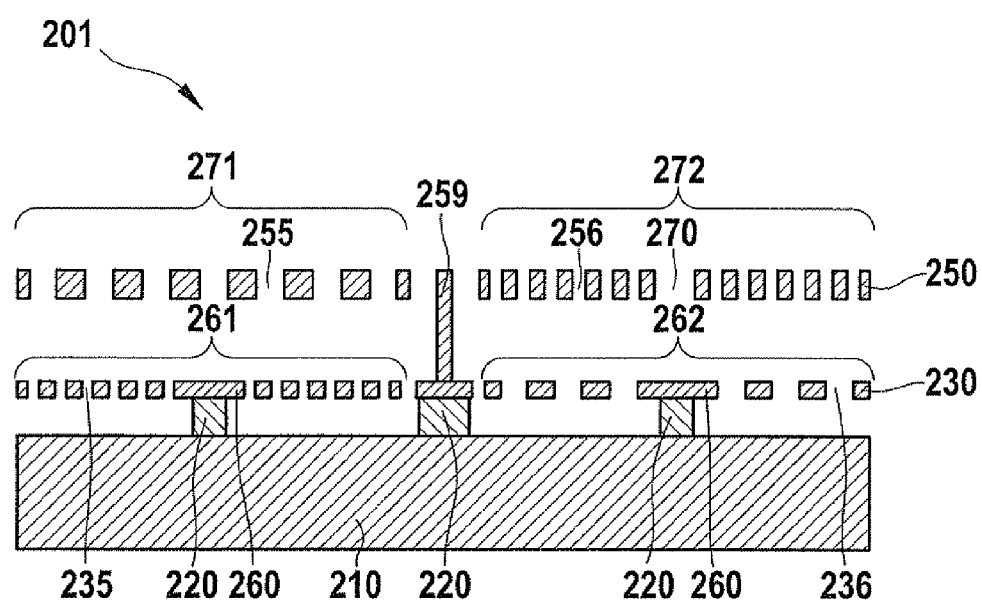
FIG. 10 shows a lateral sectional view of an additional micromechanical component.
Figure 11:
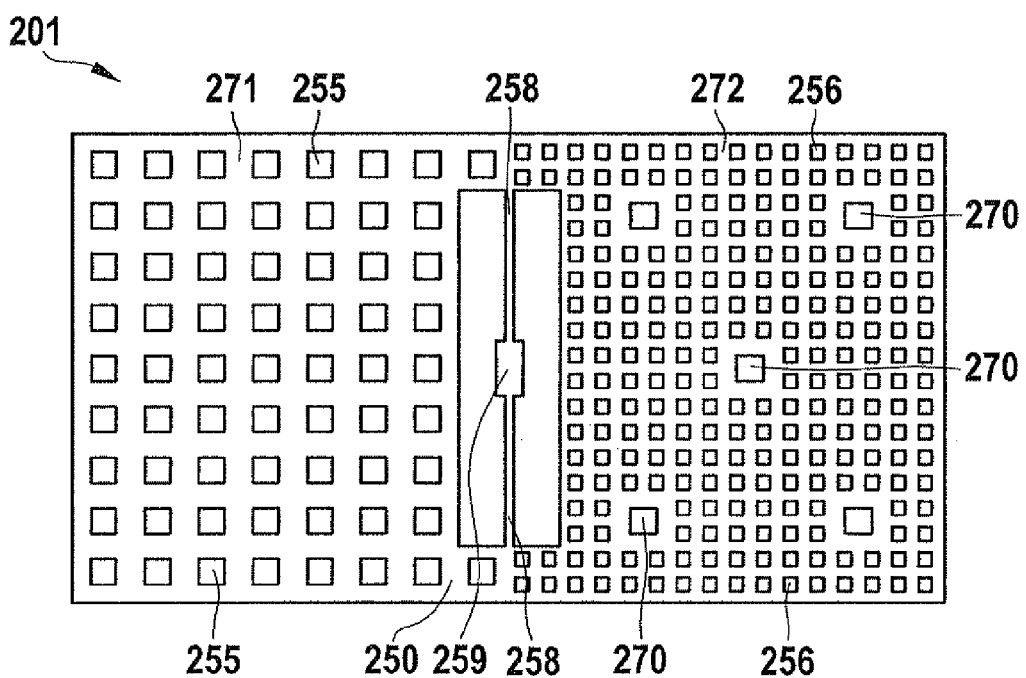
FIG. 11 shows the component from FIG. 10 in a top-view illustration.
Figure 12:
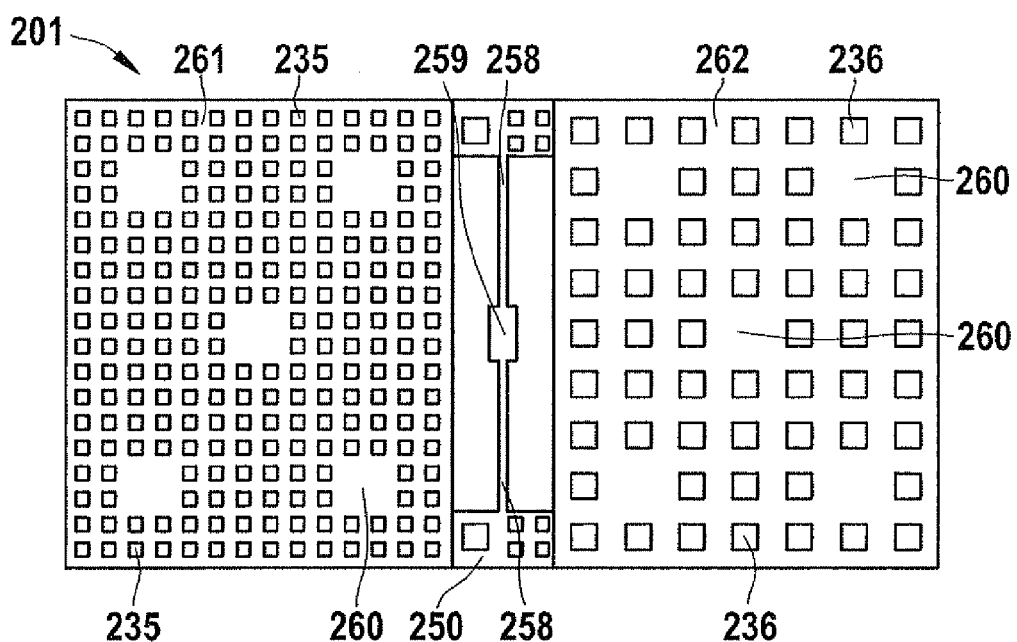
FIG. 12 shows an illustration corresponding to FIG. 11 having an additional illustration of electrodes of the component.

FIGS. 10 through 12 illustrate a micromechanical component 201 in sectional and top-view illustrations according to an additional specific embodiment. With regard to structure and functioning, component 201 generally corresponds to component 200 from FIG. 9, and may likewise be manufactured by carrying out the above-described method steps. Component 201 has a conductive layer 230 having two electrodes 261, 262 and a seismic mass 250 disposed above it having two lever arms 271, 272. The two electrodes 261, 262 are in turn provided with cut-outs 235, 236 of various dimensions, which are respectively arranged in the form of a regular grid. In contrast to component 200, in electrodes 261, 262 of component 201, regions 260 surrounded by cut-outs 235, 236 are provided in the respective grid without cut-outs. In this manner, insulating layer 220 may be advantageously removed using an etching medium without the risk of a complete underetching of electrodes 261, 262. As illustrated in FIG. 10, in this instance, insulating layer 220 remains in regions 260 (and in the region of supporting element 259) underneath conductive layer 230 and connects layer 230 or electrodes 261, 262 to substrate 210.

However, the forming of regions 260 in electrodes 261, 262 may impair the electric symmetry on both sides of rocker 250. In order to offset this, in lever arm 272, which has cut-outs 256 having small dimensions, a number of additional cut-outs 270, which have larger lateral dimensions than cut-outs 256, are provided above regions 260. In this instance, cut-outs 270 may have the same lateral dimensions as the "large" cut-outs 255 of lever arm 271.

Figure 13:
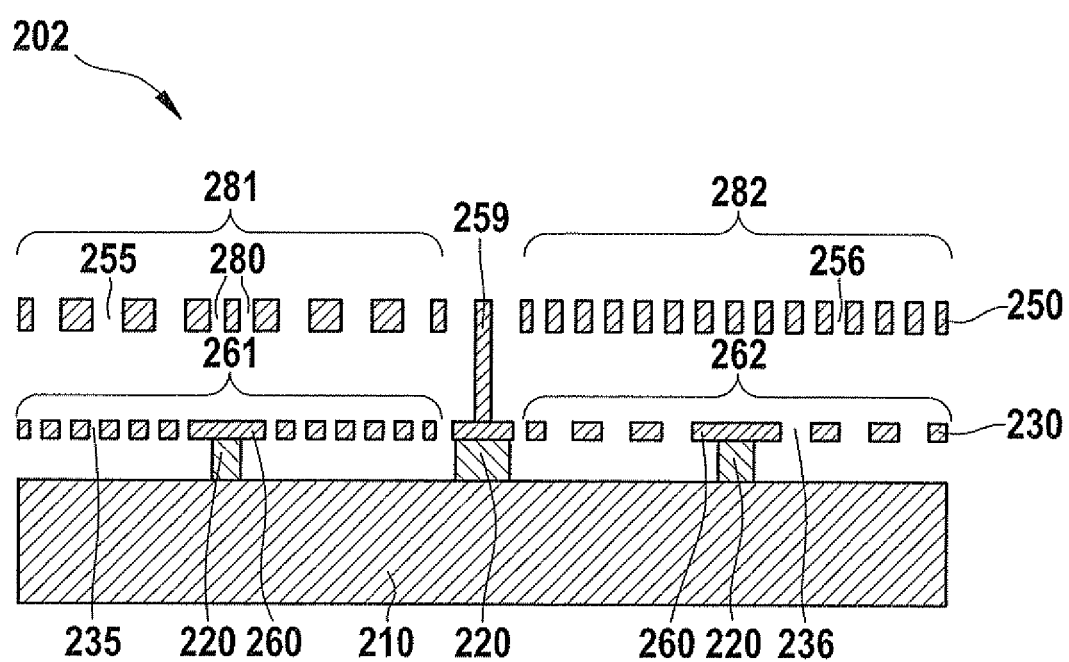
FIG. 13 shows an additional micromechanical component in a lateral sectional view.

FIG. 13 shows a micromechanical component 202 in a lateral sectional view according to an alternative specific embodiment. Component 202 generally corresponds to component 201 from FIG. 10 and includes two electrodes 261, 262 having cut-outs 235, 236 and regions 260 without cut-outs, and a flywheel mass 250 having two lever arms 281, 282. In contrast to component 201, a number of additional cut-outs 280 having smaller dimensions are provided above regions 260 in lever arm 281, which has cut-outs 255 having large dimensions. In this instance, cut-outs 280 may have the same lateral dimensions as the "small" cut-outs 256 of lever arm 282. This also allows for an electric symmetry to be achieved on both sides of rocker 250.

Components 200, 201, 202 explained with the aid of the figures and the described manufacturing method represent specific example embodiments of the present invention. Furthermore, additional specific embodiments may be realized, which include additional modifications of the present invention. For example, instead of the specified materials, other materials may be used. Instead of giving the cut-outs of the lever arms and electrodes a quadratic shape, the cut-outs may alternatively be given another form, a circular shape, for example. Furthermore, the cut-outs in the lever arms and electrodes may be provided in an arrangement other than a two-dimensional grid. Rather than obtaining a difference in the hole structures of the lever arms and electrodes through different dimensions of the cut-outs, it is possible to obtain this in a different manner, through different numbers of cut-outs, for example. In this instance, the cut-outs of the lever arms may have a uniform size, for example. This also applies to the cut-outs of the electrodes. In all of these possible modifications, the cut-outs or their disposition with regard to each other may in turn be correlated with one another such that a rocker having an asymmetrical mass distribution is provided when the lever arms have the same dimensions, and an electric symmetry is achieved on both sides of the rocker.

What is claimed is:

1. A micromechanical component for detecting an acceleration, comprising:
   a substrate;
   an insulating layer on the substrate;

a conductive layer on the insulating layer having a first and a second electrode; and a rotatable flywheel mass in the form of a rocker having a first and a second lever arm, the first lever arm being situated opposite the first electrode, and the second lever arm being situated opposite the second electrode, the first lever arm having a first hole structure having a number of first cut-outs, the second lever arm having a second hole structure having a number of second cut-outs, the first electrode having a third hole structure having a number of third cut-outs, the second electrode having a fourth hole structure having a number of fourth cut-outs, the third hole structure of the first electrode differing from the fourth hole structure of the second electrode, and the first and second lever arms having different masses;

wherein outer dimensions of the first and second lever arms correspond, and the first hole structure of the first lever arm differs from the second hole structure of the second lever arm, wherein at least one of the first and second electrodes have regions without cut-outs, wherein at least one of the first and second hole structures have additional cut-outs provided above the regions without cut-outs, the additional cut-outs having smaller dimensions than the corresponding at least one of the first and second cut-outs, wherein the insulating layer is partially removed such that a residual component of the insulating layer remains in the regions without cut-outs but not in the region with cut-outs.

2. The micromechanical component as recited in claim 1, wherein the first cut-outs of the first hole structure of the first lever arm and the second cut-outs of the second hole structure of the second lever arm have different lateral dimensions.

3. The micromechanical component as recited in claim 1, wherein the third cut-outs of the third hole structure of the first electrode and the fourth cut-outs of the fourth hole structure of the second electrode have different lateral dimensions.

4. The micromechanical component as recited in claim 3, wherein the first cut-outs of the first hole structure of the first lever arm have larger lateral dimensions than the second cut-outs of the second hole structure of the second lever arm, and wherein the fourth cut-outs of the fourth hole structure of the second electrode have larger lateral dimensions than the third cut-outs of the third hole structure of the first electrode.

5. The micromechanical component as recited in claim 1, wherein the third cut-outs of the third hole structure of the first electrode and the fourth cut-outs of the fourth hole structure of the second electrode are respectively arranged in the form of a grid, the first and second electrodes including the regions without cut-outs in the respective grids.

6. The method as recited in claim 1, wherein the only electrode situated opposite the first lever arm is the first electrode and the only electrode situated opposite the second lever arm is the second electrode.

7. A method for manufacturing a micromechanical component for detecting an acceleration, comprising:

providing a substrate;

forming an insulating layer on the substrate;

forming a patterned conductive layer on the insulating layer having a first and a second electrode;

forming a sacrificial layer on the conductive layer;

forming a patterned functional layer on the sacrificial layer for a rotatable flywheel mass in the form of a rocker having a first and a second lever arm, the first lever arm having a first hole structure having a number of first cut-outs, the second lever arm having a second hole structure having a number of second cut-outs, the first electrode having a third hole structure having a number of third cut-outs, the second electrode having a fourth hole structure having a number of fourth cut-outs, the third hole structure of the first electrode differing from the fourth hole structure of the second electrode, and the first and the second lever arm having different masses, wherein at least one of the first and second electrodes have regions without cut-outs, wherein at least one of the first and second hole structures have additional cut-outs provided above the regions without cut-outs, the additional cut-outs having smaller dimensions than the corresponding at least one of the first and second cut-outs; and removing the sacrificial layer, the flywheel mass being exposed and the first lever arm being situated opposite the first electrode, and the second lever arm being situated opposite the second electrode;

wherein the patterned functional layer is formed in such a manner that outer dimensions of the first and second lever arms correspond, and the first hole structure of the first lever arm differs from the second hole structure of the second lever arm, wherein the insulating layer is partially removed such that a residual component of the insulating layer remains in the regions without cut-outs but not in the region with cut-outs.

8. The method as recited in claim 7, wherein the first cut-outs of the first hole structure of the first lever arm and the second cut-outs of the second hole structure of the second lever arm have different lateral dimensions.

9. The method as recited in claim 7, wherein the removal of the sacrificial layer includes introducing an etching medium to the sacrificial layer through the hole structures of the functional layer, the etching medium reaching the insulating layer via the hole structures of the first and second electrodes and the insulating layer being partially removed.

* * * * *